United States Patent
Walter

(10) Patent No.: US 7,228,197 B2
(45) Date of Patent: Jun. 5, 2007

(54) SPINDLE DEVICE WITH STATE MONITORING, AND MONITORING METHOD AND MONITORING SYSTEM THEREFORE

(75) Inventor: Rudolf Walter, Solothurn (CH)

(73) Assignee: Siemens Aktiengesellschaft, München (DE)

( * ) Notice: Subject to any disclaimer, the term of this patent is extended or adjusted under 35 U.S.C. 154(b) by 24 days.

(21) Appl. No.: 10/968,829

(22) Filed: Oct. 19, 2004

(65) Prior Publication Data

US 2005/0160847 A1 Jul. 28, 2005

(30) Foreign Application Priority Data

Oct. 20, 2003 (DE) .................... 103 48 608

(51) Int. Cl.
*G06F 19/00* (2006.01)
(52) U.S. Cl. .............. 700/174; 702/34; 702/184; 340/679; 340/680
(58) Field of Classification Search .......... 700/174, 700/160; 340/679, 680, 682; 74/89.37; 73/658, 660, 661; 702/33, 34, 35, 182, 183, 702/184, 185
See application file for complete search history.

(56) References Cited

U.S. PATENT DOCUMENTS

| | | | |
|---|---|---|---|
| 5,900,553 A * | 5/1999 | Hasegawa ................ 73/660 |
| 6,269,284 B1 * | 7/2001 | Lau et al. ................ 700/160 |
| 7,011,613 B2 * | 3/2006 | Moller et al. ............ 700/174 |
| 2002/0029115 A1 * | 3/2002 | Moriuchi .................. 702/34 |
| 2002/0194304 A1 * | 12/2002 | Cramer et al. ........... 345/733 |
| 2003/0030565 A1 * | 2/2003 | Sakatani et al. ......... 340/679 |
| 2003/0103827 A1 * | 6/2003 | Moller et al. ............ 409/231 |

FOREIGN PATENT DOCUMENTS

| DE | 100 07 126 A1 | 9/2001 |
|---|---|---|
| DE | 101 44 459 A1 | 4/2003 |

* cited by examiner

*Primary Examiner*—Leo Picard
*Assistant Examiner*—Charles Kasenge
(74) *Attorney, Agent, or Firm*—Henry M. Feiereisen

(57) ABSTRACT

A spindle device for driving a production machine includes a first sensor for detecting a first physical variable of the spindle device, and at least a second sensor for detecting a second physical variable of the spindle device. In this way, it becomes possible to determine the oscillation amplitude of the rotor of a spindle and a temperature profile of a rolling bearing. Monitoring maximum values allows identification of a crash event, whereas the temperature profile allows conclusions as to a need for maintenance. Signal evaluation can take place centrally at the spindle manufacturer's end, thereby allowing needed maintenance works to be planned long term and effectively.

10 Claims, 5 Drawing Sheets

SPINDLE DEVICE WITH STATE MONITORING, AND MONITORING METHOD AND MONITORING SYSTEM THEREFORE

CROSS-REFERENCES TO RELATED APPLICATIONS

This application claims the priority of German Patent Application, Serial No. 103 48 608.9, filed Oct. 20, 2003, pursuant to 35 U.S.C. 119(a)–(d), the disclosure of which is incorporated herein by reference.

BACKGROUND OF THE INVENTION

The present invention relates to a spindle device for operating a production machine. The present invention further relates to a monitoring system for monitoring at least one such spindle device, as well as to a method of operating a spindle device.

Nothing in the following discussion of the state of the art is to be construed as an admission of prior art.

Increase in productivity is a primary goal for the manufacturing industry and the stimulus for optimization and development in the field of production planning and process technique. It is therefore of great importance to operate a primary spindle as effective as possible for a production machine, e.g. a milling machine or a lathe. To enhance and ensure a high effectiveness, the need for an automated supervision of the primary spindle is desired.

For monitoring spindles effectively, existing systems provide a classification of various conditions of the spindle, i.e. establishment of limit values for measured, processed and recorded signals or information. Currently available diagnosis systems are based on the evaluation of a single vibration signal which is ascertained by a vibration sensor mounted externally to the spindle. The spindle diagnosis takes place almost in real time during periodic sensor measurement. Generated information remains hereby with the owner of the spindle. Machine manufacturers or spindle manufacturers normally do not have access to the recorded data.

State evaluation is typically realized by means of a trend analysis of parameters obtained from a measuring signal, such as for example the effective value of the acceleration or the vibration speed across certain frequency ranges or amplitude spectrums. The principle of trend analysis during a periodic data acquisition is illustrated in FIG. 1 which is a graphical illustration of the vibration amplitude of a bearing of a primary spindle as a function of the date or time. So long as the vibration amplitude in the present example of FIG. 1 is smaller than 50 amplitude units, the vibration amplitude is in a non-critical range 1 which represents a state in which the spindle and thus the machine operates properly. In range 2 above the range 1, the vibration amplitude of the spindle bearing is between 50 and 80 amplitude units, and the spindle and thus the machine are in a state in which maintenance works needs to be scheduled and a breakdown can be expected. When the vibrations are even higher and reach the range 3 above 80 amplitude units, the spindle and thus the machine are in a state that requires immediate actions as a breakdown is imminent.

The graph 4 shown in FIG. 1 represents a typical profile of the vibration amplitude of the bearing of a primary spindle as a function of the time (date). Starting from an actual time instance 5, a time instance 7 can be predicted through extrapolation 6 when the machine breaks down or actions are absolutely required. The time period up to the time instance 7 may thus be exploited to undertake the needed maintenance works. The limit values required for delineating the various states are ascertained through statistically obtained data. This learning process is time-consuming and produces a limit value for only a single spindle type in a particular machine and possibly for only a single particular manufacturing operation. This type of limit value determination is thus unsuitable for operation of primary spindles and other production machines.

It would therefore be desirable and advantageous to provide an improved diagnosis system for spindle devices, which obviates prior art shortcomings and which is simple in structure and yet reliable in operation.

SUMMARY OF THE INVENTION

According to one aspect of the present invention, a spindle device for driving a production machine includes a first sensor for detecting a first physical variable of the spindle device, and at least a second sensor for detecting a second physical variable of the spindle device.

According to another feature of the present invention, the first physical variable and/or the second physical variable may each represent a distance traveled, speed, acceleration, or a particular direction component. This makes it possible to detect vibrations of the spindle which are generated by eccentricity or spindle components. The determination of directional components of the vibrations is especially advantageous to allow targeted maintenance works.

The first physical variable or second physical variable may also represent a spindle temperature or a rotation speed of the spindle. In this way, the condition of a spindle can be determined in response to temperature limits that have been established by the spindle bearing manufacturer, and suitable actions can be triggered. The analysis in response to the temperature value can be enhanced by recording also the rotation speed of the machine. Thus, an increase in temperature may be ascribed, for example, to a momentary increase in the rotation speed of the machine, indicating that no maintenance works need yet to be scheduled.

According to another feature of the present invention, the first sensor and the at least one second sensor may be arranged in a spindle housing. This means that the diagnosis sensor technology is firmly integrated in the spindle and no external sensors are required to be attached later on.

According to another feature of the present invention, the spindle device may include a memory for temporarily storing data of the first sensor and the at least one second sensor, and a controller for processing the data. Suitably, the first sensor and the at least one second sensor as well as the memory and the controller are integrated in a measuring ring which is disposed in proximity of one spindle bearing. In this way, the diagnosis assembly can easily be integrated in the spindle while the spindle in turn can be individually configured for providing the diagnosis data.

According to another feature of the present invention, the spindle device may include a classification unit for rating the condition of the spindle device in response to data from the first sensor and the at least one second sensor. In this way, classification may be carried out not only externally in a central diagnosis station but directly in the spindle so that data transfer rates can be reduced. The classification may, however, also be carried out internally or externally in dependence on the respective system load.

According to another aspect of the present invention, a monitoring system for monitoring at least a spindle device includes an evaluation unit for determining or predicting a maintenance need of the at least one spindle device. As a result, a manufacturer, for example, is in a position to precisely monitor the availability of a plurality of spindles. Suitably, the spindles are linked by a data network, such as the Internet.

A monitoring system or diagnosis system according to the present invention affords the manufacturer of spindles or machine tools information about the life cycle or load cycle. Moreover, data stored in a ring memory may be used to analyze damages in order to assess possible warranty claims. In addition, the need for a limit value determination, as required in conventional monitoring systems, is omitted and replaced by a so-called Teach-In-Process as the required limit values, e.g. temperature limit value, are preset by the manufacturer.

According to another feature of the present invention, the spindle device may include a temperature sensor for providing data for the evaluation unit which generates a temperature signal in response to the data from the temperature sensor and compares the temperature signal with a limit value for determining the maintenance need.

According to another aspect of the present invention, a method of operating a spindle includes the steps of determining a first set of data in response to a first physical variable of the spindle, determining a second set of data in response to at least one second physical variable of the spindle, and operating the spindle and/or controlling an accompanying process in response to the first and second sets of data.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
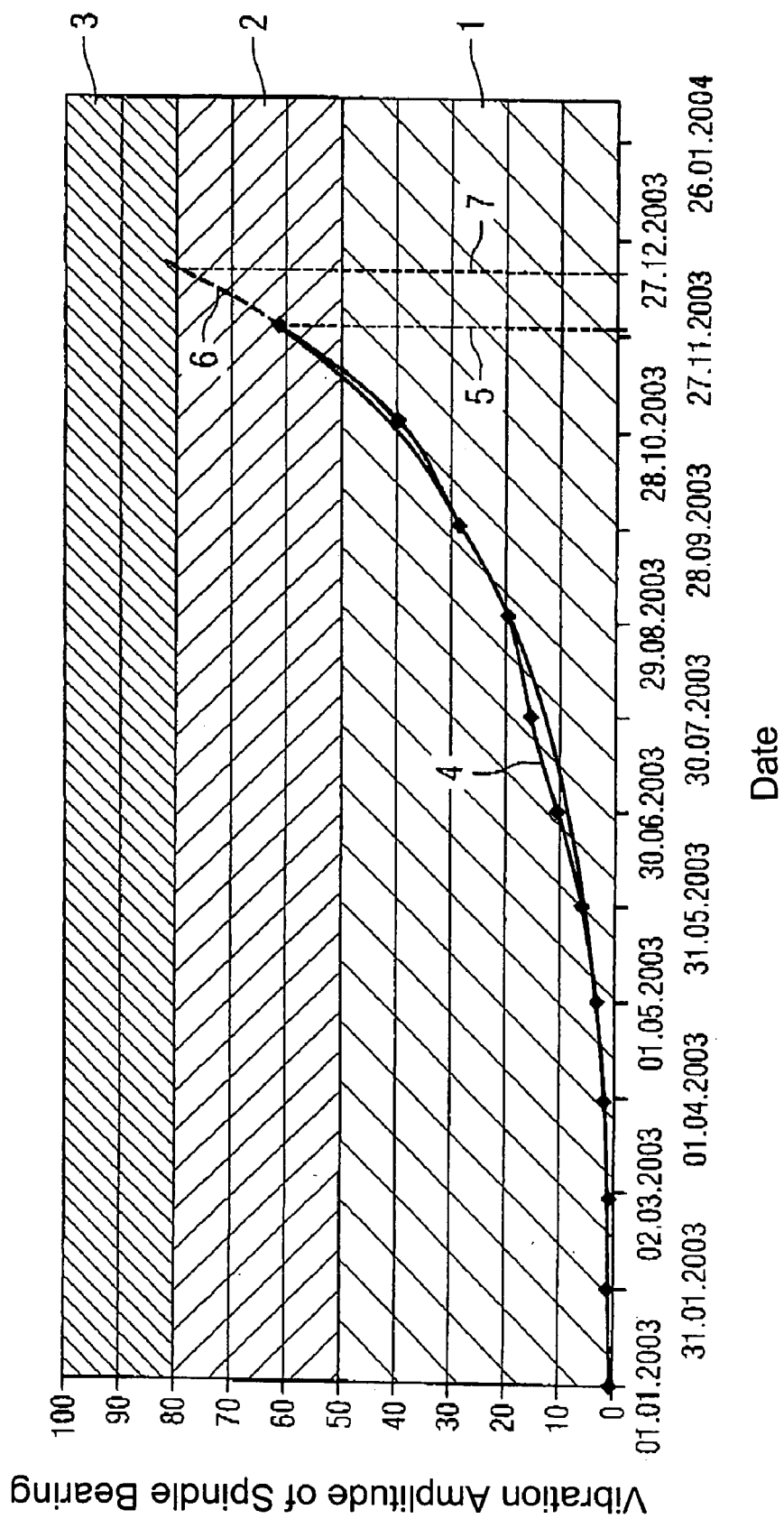
FIG. 1 is a graphical illustration of a trend analysis during a periodic data acquisition, depicting the vibration amplitude as a function of date (time)

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
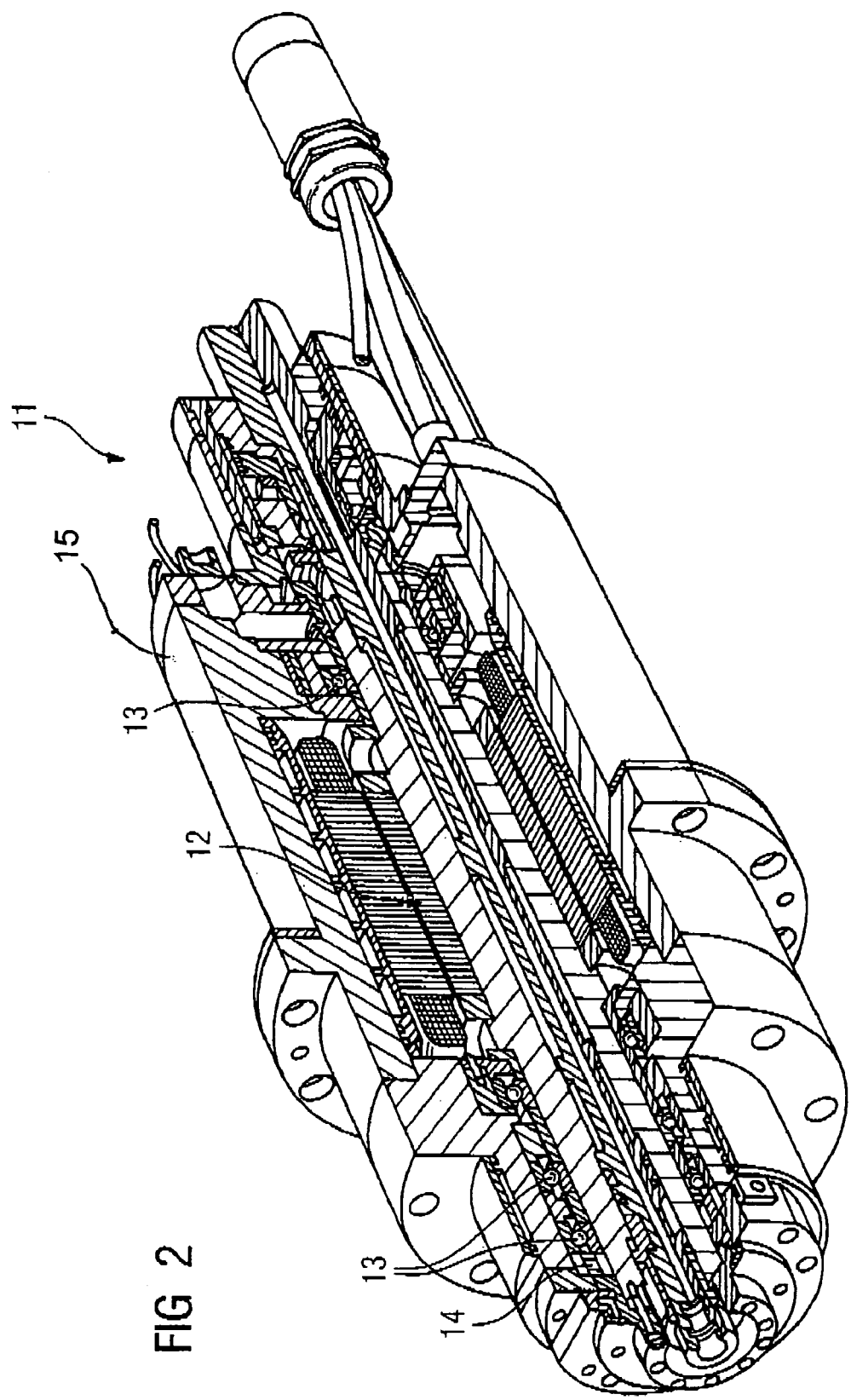
FIG. 2 is a longitudinal section of a motor spindle according to the present invention.

Turning now to the drawing, and in particular to FIG. 2, there is shown a longitudinal section of a motor spindle according to the present invention, generally designated by reference numeral 11. The motor spindle includes a rotor 12 which is supported by bearings 13 in a spindle housing 15. Disposed immediately adjacent to one of the bearings 13 (here, by way of example, the leftmost bearing) is a measuring ring 14 which is constructed to include several sensors, a memory element and a microcontroller. Currently preferred is the use of the following sensors for incorporation in the measuring ring 14: three acceleration sensors for the three directions in space, two inductive distance sensors in axial direction as well as two radial inductive distance sensors, a speed sensor, and a temperature sensor. The sensors may be arranged in the measuring ring 14 in any suitable manner. Of course, it is also conceivable to integrate the sensors individually or in groups in the spindle 11, instead of combining the sensors in a common measuring ring.

The measuring ring 14 further includes a running time meter for ascertaining the running time of the spindle, whereby the ascertained running times are stored in a memory.

As the sensors generate information, the condition of the spindle 11 can be classified not only on the basis of a single signal but on the basis of several signals. In other words, the spindle condition can be rated in response to multiple signals. This multidimensional data acquisition enables an analysis of the signal patterns of the sensors to rate the spindle condition, without requiring complicated processes to determine limit values.

The state of a spindle or the condition of its bearing may change, for example through so-called crash events or also through normal wear. A crash event may, for example, be a situation in which the tool or chuck of a machine tool collides with a workpiece. Such an event impairs the entire spindle or at least parts thereof so that premature maintenance works become necessary.

By combining different signal types, a crash of the spindle can be recognized through characteristic signal patterns. In the event of a crash, the direction of the force introduction determines in which of the sensors, due to its installation direction, a signal with characteristic profile can be recognized. A crash, for example, can be unambiguously determined by a combination of distance signal and acceleration signal. Even the type of crash, whether "fast" crash with dynamically imposed overload, or "slow" crash with statically imposed overload, can be identified.

Figure 3A:
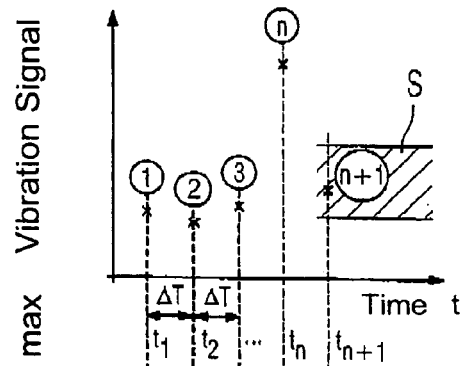
FIGS. 3A–3H are graphical illustrations of measurements of different physical variables as a result of crash events.
Figure 3B:
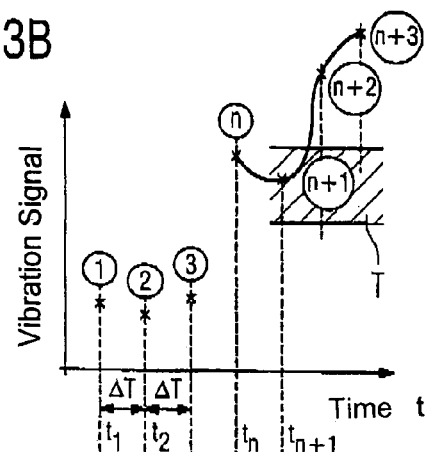

A fast crash normally causes per time unit $\Delta T$ a significant increase of the maximum value of a vibration signal. In other words, the maximum values measured in the event of a crash in a time period $\Delta T$ are significantly greater than the values encountered during normal operation. This is shown in FIGS. 3A and 3B, depicting a graphical illustration of a vibration signal as a function of the time t. A general variable, e.g. the amplitude, the speed or the acceleration of a vibration signal, reaches maximum values (1), (2) and (3) during normal operation on average in the time period $\Delta T$. In the event of a crash, the maximum value (n) is obtained which significantly exceeds the values (1), (2) and (3).

For values, measured after the crash event $(t>t_n)$, two patterns are basically conceivable in dependence on the intensity of the crash. On one hand, the signal (n+1) may proceed at a same level after the crash as before the crash. In this case, the signal continues to remain in a desired range S, as shown in FIG. 3A, so that the crash event may be identified only by the elevated value (n). On the other hand, the signal (n+1), (n+2), (n+3) may continue to remain at the level of value (n) of the crash event, or exceed the value (n), as shown in FIG. 3B. If the maximum value of the vibration signal does not stray from the value range T even after the crash event, the crash may be qualified differently than in the graphical illustration of FIG. 3B in which the values continue to ascend. In both cases, the crash can be identified as a result of the excessive signals (n), (n+1), (n+2), . . . after the time instance $t_n$.

Figure 3C:
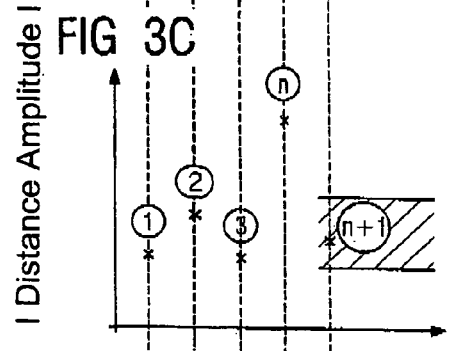
Figure 3D:
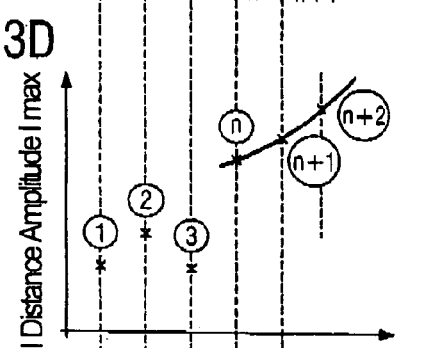

FIG. 3C shows a diagram which depicts concretely the maximum magnitude of the vibration or distance signal for discrete time values during a fast crash, i.e. during a dynamically imposed overload. The graphical illustration corresponds to the illustration of FIG. 3A. FIG. 3D, on the other hand, depicts the maximum distance amplitude during a slow crash, i.e. during a statically imposed overload. In this case, the magnitude of the amplitude ascends continuously. This value change after the crash event would not be identifiable, using acceleration or speed sensors only. Thus, a distance sensor can be used to identify a slow crash and can be employed for providing a forecast.

Figure 3E:
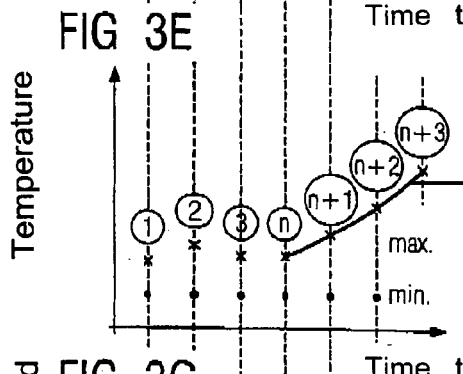
Figure 3F:
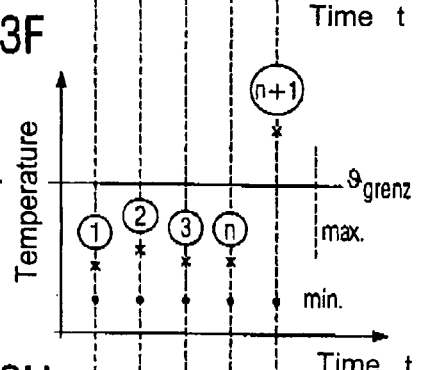

Following a crash event that has been ascertained in response to maximum values of the oscillation or distance signal at the time instance $t_n$, two different temperature profiles can be expected depending on the degree of damage as a consequence of the crash. These temperature profiles are shown in FIGS. 3E and 3F. FIG. 3E shows a steady linear, exponential or similar rise of the maximum temperature, whereas FIG. 3F shows the temperature to suddenly rise in the time period $t > t_n$. A limit temperature $\theta_{grenz}$, as given by the bearing manufacturer, should not, or only briefly, exceeded so that lubricant is not overstrained.

Figure 3G:
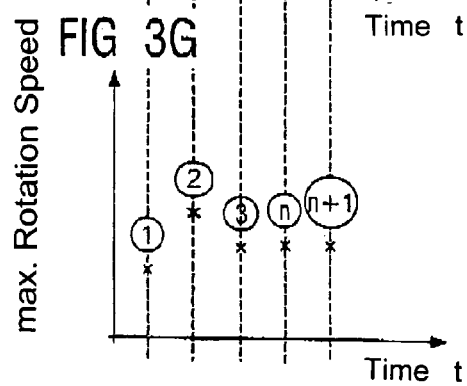
Figure 3H:
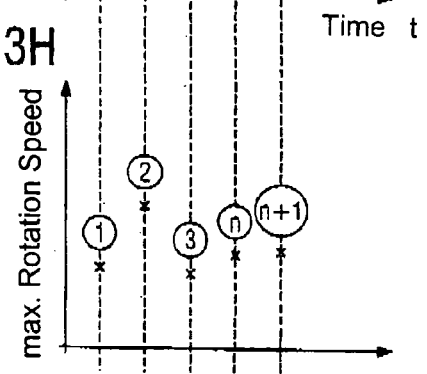

The rotation speed range should be monitored simultaneously with the temperature profile, as shown in FIGS. 3G and 3H depicting graphical illustrations of discrete maximum values of the rotation speed as a function of the time T. Hereby, it is to be examined that no significant differences in rotation speed are encountered before and after a crash at time instance $t = t_n$. As the rotation speed is elevated, the temperature signal would increase as well in dependence on the rotation speed so that an increase in temperature, even when exceeding the limit temperature $\theta_{grenz}$, cannot necessarily be interpreted as crash indicator. The same applies also for the interpretation of the graphs of FIGS. 3A to 3D.

A condition-based maintenance requires an action when the temperature, measured per time period, significantly exceeds the temperature measured on average previously and is above the admissible operating temperatures of rolling bearings or lubricant, as set by the bearing manufacturer, or exceeds the admissible limit temperature, as set by the spindle manufacturer. The temperature profile, calibrated with the rotation speed signal, provides thus a sufficient criterion for triggering a maintenance alert on the basis of previously set limit values.

Figure 4A:
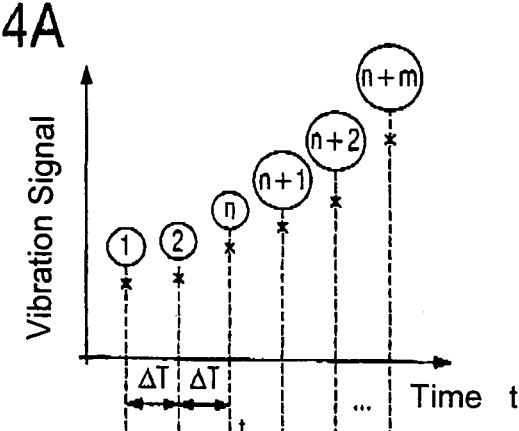
FIGS. 4A–4E are graphical illustrations of measurements of physical variables of a spindle with typical wear.
Figure 4B:
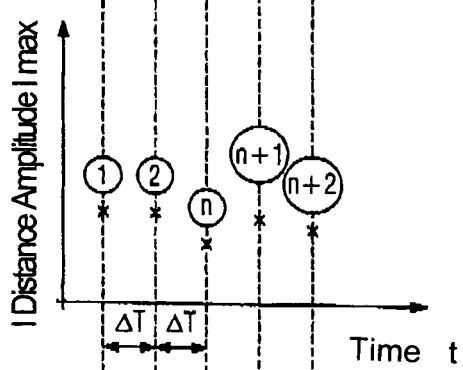
Figure 4C:
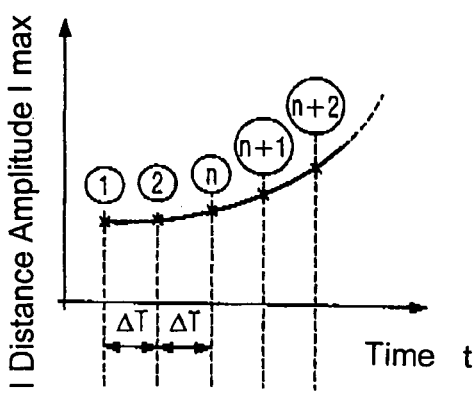
Figure 4D:
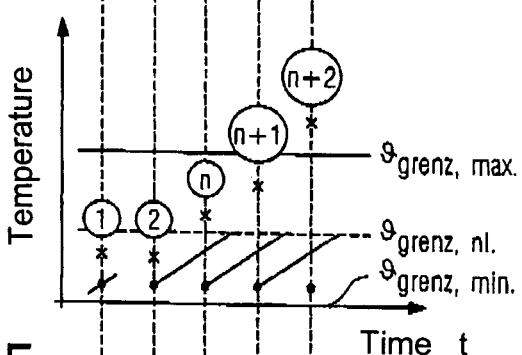
Figure 4E:
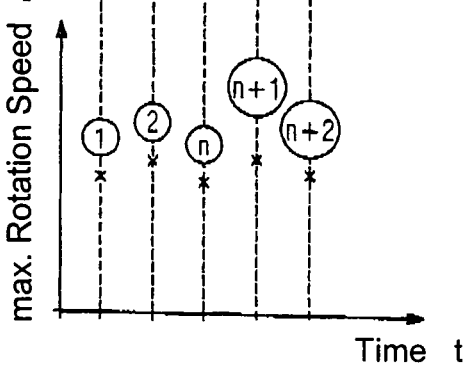

The trend analysis is based on a linear or exponentially ascending course of vibration signal and amount of the maximum distance amplitude, in the event of a change in the spindle condition or bearing condition. FIG. 4A is a diagram, depicting discrete maximum values (1), . . . (n), (n+1), . . . (n+m) as a function of time t, whereby the time instance $t_n$ indicates a crash event. Depending on the type of crash, the maximum amount of the distance amplitude may be changed by the crash, as shown in FIG. 4B, or may remain unaffected by the crash, as shown in FIG. 4C, and thus continue to steadily rise. A condition-based maintenance is again triggered by the temperature profile, with a minimum temperature $\theta_{grenz\ min}$, a normal temperature $\theta_{grenz\text{-}nl}$, and an absolute maximum $\theta_{grenz\ max}$, may be used for interpretation and triggering the maintenance alert. For example, a service call is set off above the maximum $\theta_{grenz\ max}$, whereby again the discrete maximum speed, as shown in FIG. 4E, should be taken into account.

The operating spindle conditions may be classified with consideration of absolutely valid limit values of the bearing kinematics. The measured distance signals may hereby be used for checking the bearing kinematics. Using algorithms for computing the bearing kinematics according to Brändlein, J; Klühspiess, N.: "Die Lagerverteilung in schnell laufenden Kugellagern, Werkstatt and Betrieb (*The Bearing Distribution in Rapidly Running Ball Bearings, Workshop and Operation*), 105$^{th}$ year, 1972, No. 9, or to Harris, T., "Rolling Bearing Analysis", John Wiley Sons, 1991, allows suppositions about parameters which characterize the bearing kinematics or stress. Taking into account geometric data of the bearing, spindle (bearing distance, shaft geometry), tool (tool diameter and tool length), and consideration of shaft flexibility as well as speed and temperature determined by the temperature sensor, the following parameter can be calculated through adaptation of the algorithm:

(1) maximum Hertzian area stress in the rolling contacts encountered in the bearing ($p_0$),
 (2) ratio between drilling speed and roll angle speed of the rolling bodies (BRV), and
 (3) leading and trailing runs of rolling body (WVN).

A decrease in the useful life with respect to the rotation speed can be expected, if
 (1) $p_0 > (2.000 \ldots 2.500)$ MPa, depending on material of the rolling partners, here 100 Cr6 and Cronidur®30 rolling bearing steels,
 (2) BRV>0.5
 (3) WVN>0.5 times the cage pocket play.

The model formation thus allows an absolute determination of the limit value a priori, without Teach-in. When these limit values are exceeded, the useful life of the spindle is reduced. By storing the signals, optionally pre-processed signals according to above scheme, in a ring memory, in which the first stored information is also read first, the signals are made accessible to the machine manufacturer or spindle manufacturer and analyzed in a post-processing system. In this way, conclusions about warranty claims are made possible.

Figure 5:
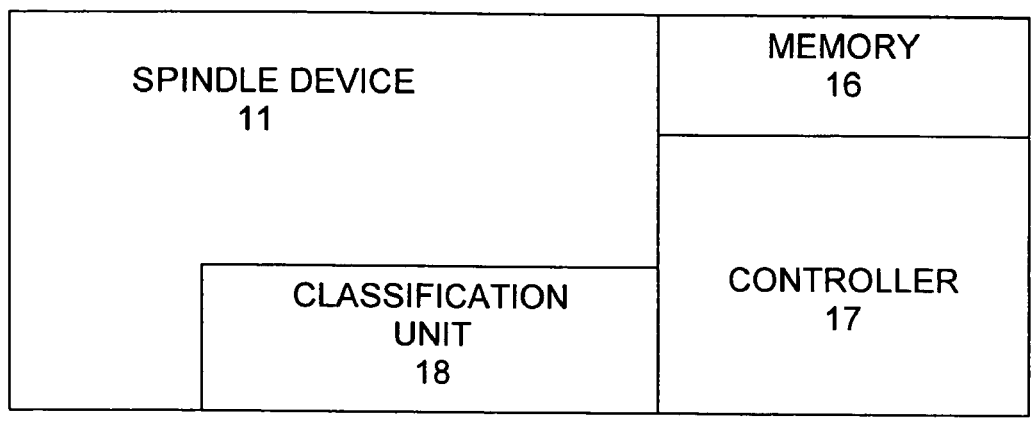
FIG. 5 is a block diagram of a variation of a spindle device according to the present invention.

Turning now to FIG. 5, there is shown that the spindle 11 may include a memory 16 for temporarily storing data of the sensors, and a controller 17 for processing the data. Suitably, the sensors as well as the memory 16 and the controller 17 are integrated in the measuring ring 14. In this way, the diagnosis assembly can easily be integrated in the spindle Ii while the spindle 11 in turn can be individually configured for providing the diagnosis data. The spindle 11 further includes a classification unit 18 for rating the condition of the spindle 11 in response to data from the sensors. In this way, classification may be carried out not only externally in a central diagnosis station but directly in the spindle so that data transfer rates can be reduced. The classification may, however, also be carried out internally or externally in dependence on the respective system load.

Figure 6:
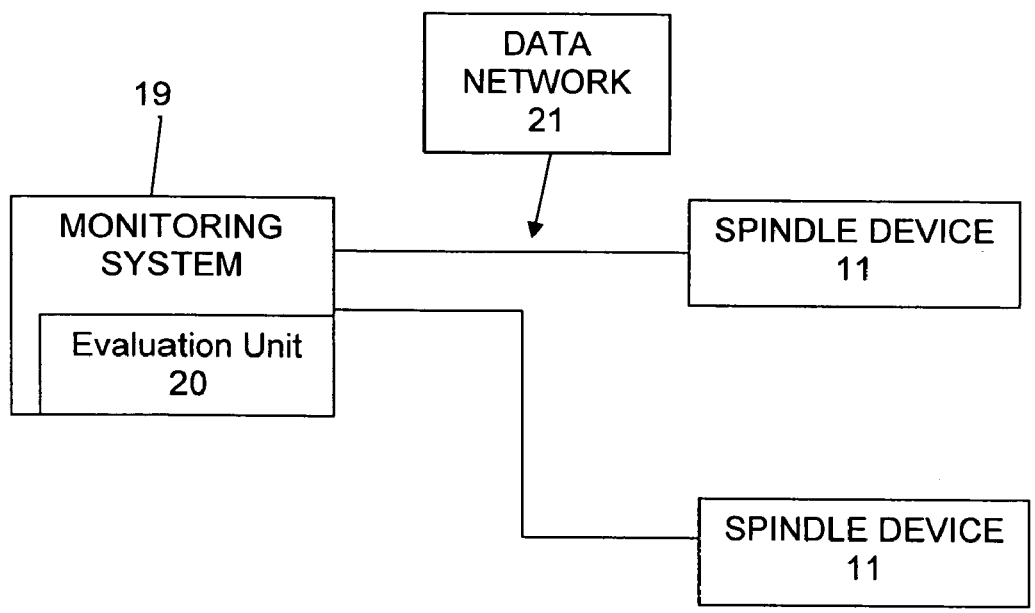
FIG. 6 is a block diagram of a monitoring system for monitoring a spindle assembly.

Referring now to FIG. 6, there is shown a monitoring system 19 for monitoring at least one spindle 11, or as shown here for monitoring two spindles 11. Of course, the monitoring system 19 may be applicable also for monitoring more than two spindles 11. The monitoring system 19 includes an evaluation unit 20 for determining or predicting a maintenance need of the spindles 11. As a result, a manufacturer, for example, is in a position to precisely monitor the availability of a plurality of spindles. Suitably, the spindles 11 are linked by a data network 21, such as the Internet.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An apparatus comprising
    at least one spindle device constructed for driving a production machine and including a first temperature sensor for detecting a first temperature variable of the spindle device, and at least a second temperature sensor for detecting a second temperature variable of the spindle device; and
    a monitoring system for monitoring the spindle device, said monitoring system comprising an evaluation unit receiving the first and second temperature variables from the first and second temperature sensors for determining or predicting a maintenance need of the spindle device.

2. The apparatus of claim 1, and further comprising a spindle housing, said first temperature sensor and said at least one second temperature sensor being arranged in the spindle housing.

3. The apparatus of claim 1, and further comprising a memory for temporarily storing data of the temperature first sensor and the at least one second temperature sensor, and a controller for processing data.

4. The apparatus of claim 3, and further comprising a measuring unit disposed in proximity of a spindle bearing, said temperature first sensor and said at least one second temperature sensor, said memory and said controller being integrated in the measuring unit.

5. The apparatus of claim 1, and further comprising a classification unit for rating a state of the spindle device in response to data from the first temperature sensor and the at least one temperature second sensor.

6. The apparatus of claim 1, wherein the evaluation unit is constructed to generate a temperature signal in response to the data from the temperature sensors and to compare the temperature signal with a limit value for determining the maintenance need.

7. The apparatus of claim 1, and further comprising a data network, said at least one spindle device and said evaluation unit being operatively connected to the data network.

8. The apparatus of claim 7, wherein the data network is the Internet.

9. A method of operating a spindle, comprising the steps of:
    determining a first set of temperature data in response to a first physical variable of the spindle:
    determining a second set of temperature data in response to at least one second physical variable of the spindle;
    operating the spindle and/or controlling an accompanying process in response to the first and second sets of temperature data;
    comparing the temperature data of the first or second set of temperature data with a limit value for determining a maintenance need of the spindle, and
    classifying a state of the spindle in response to the first and second sets of temperature data.

10. The method of claim 9, and further comprising the step of temporarily storing the first and second sets of data in a storage device located in the spindle.

\* \* \* \* \*